J. F. PLACE.
ART OR PROCESS OF PRODUCING LIQUID AIR.
APPLICATION FILED NOV. 27, 1907.

918,468.

Patented Apr. 13, 1909.
2 SHEETS—SHEET 1.

Witnesses:
Elon S. Hobbs
L. Percy Jones

Inventor:
J. F. Place

J. F. PLACE.
ART OR PROCESS OF PRODUCING LIQUID AIR.
APPLICATION FILED NOV. 27, 1907.

918,468.

Patented Apr. 13, 1909.
2 SHEETS—SHEET 2.

and State of New Jersey, have invented certain
UNITED STATES PATENT OFFICE.

JAMES F. PLACE, OF GLENRIDGE, NEW JERSEY, ASSIGNOR TO AMERICAN AIR LIQUEFYING CO., A CORPORATION OF NEW YORK.

ART OR PROCESS OF PRODUCING LIQUID AIR.

No. 918,468.  Specification of Letters Patent.  Patented April 13, 1909.

Application filed November 27, 1907. Serial No. 404,040.

*To all whom it may concern:*

Be it known that I, JAMES F. PLACE, a citizen of the United States, and a resident of Glenridge, in the county of Essex and State of New Jersey, have invented certain new and useful Improvements in the Art or Process of Producing Liquid Air, of which the following is a specification.

This invention relates to improvements in the art or process of liquefying air or other gases.

My system also involves partial separation of air into its constituent gases, oxygen and nitrogen, or fractional distillation of the liquid air as produced.

I utilize the latent heat of vaporization of low-pressure liquid air, as set forth in my application Serial No. 334,104, but I make use of the low temperatures obtained by expanding air in an engine and cooling the compressed air supplied to or expanded therein by the cold expanded air exhausted therefrom, as a part of the process or cycle herein.

In order that those skilled in the art may make use of my invention, I will describe my present process, as illustrated by the accompanying drawings, in which—

Figure 1:
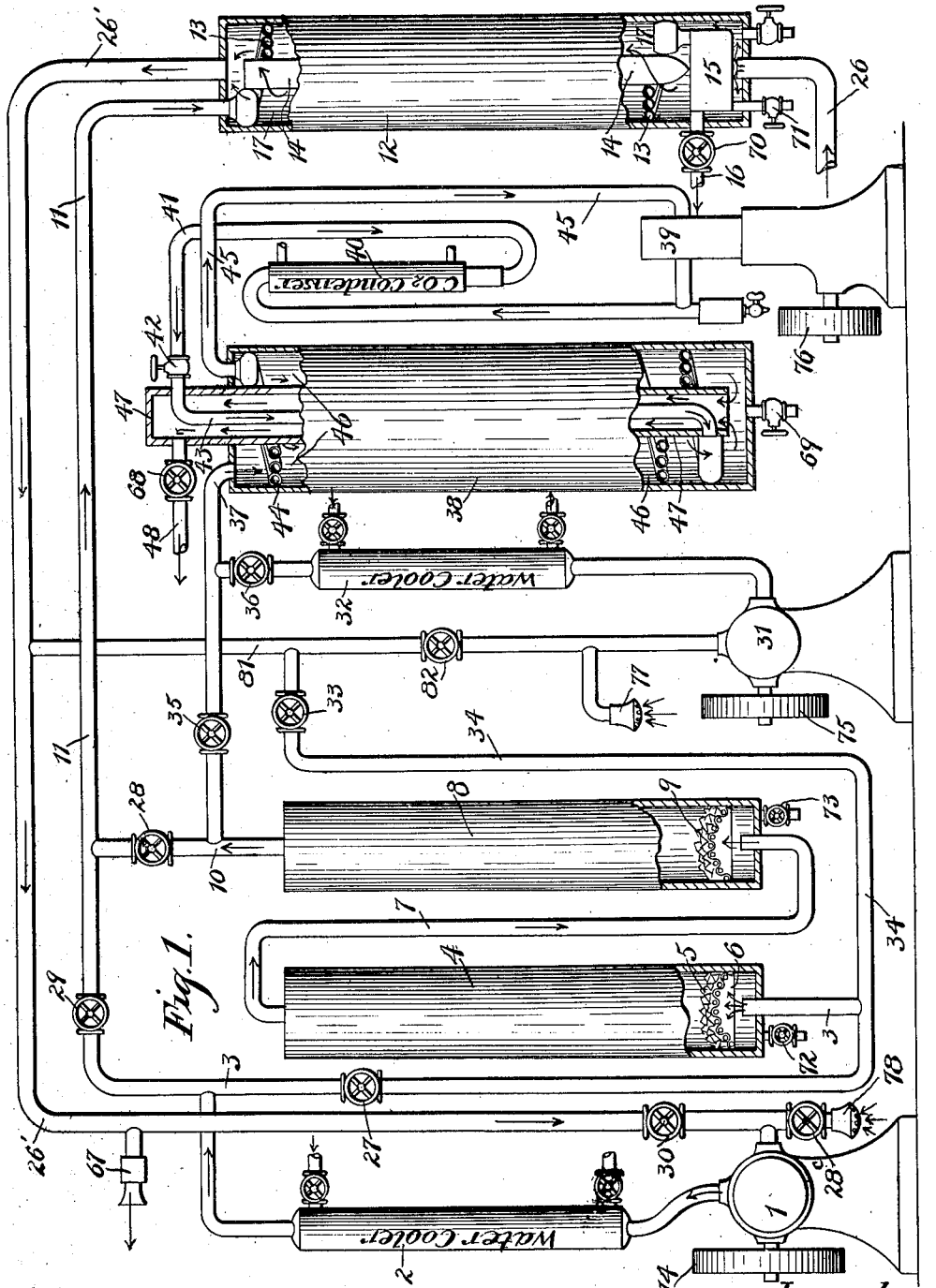
Figure 2:
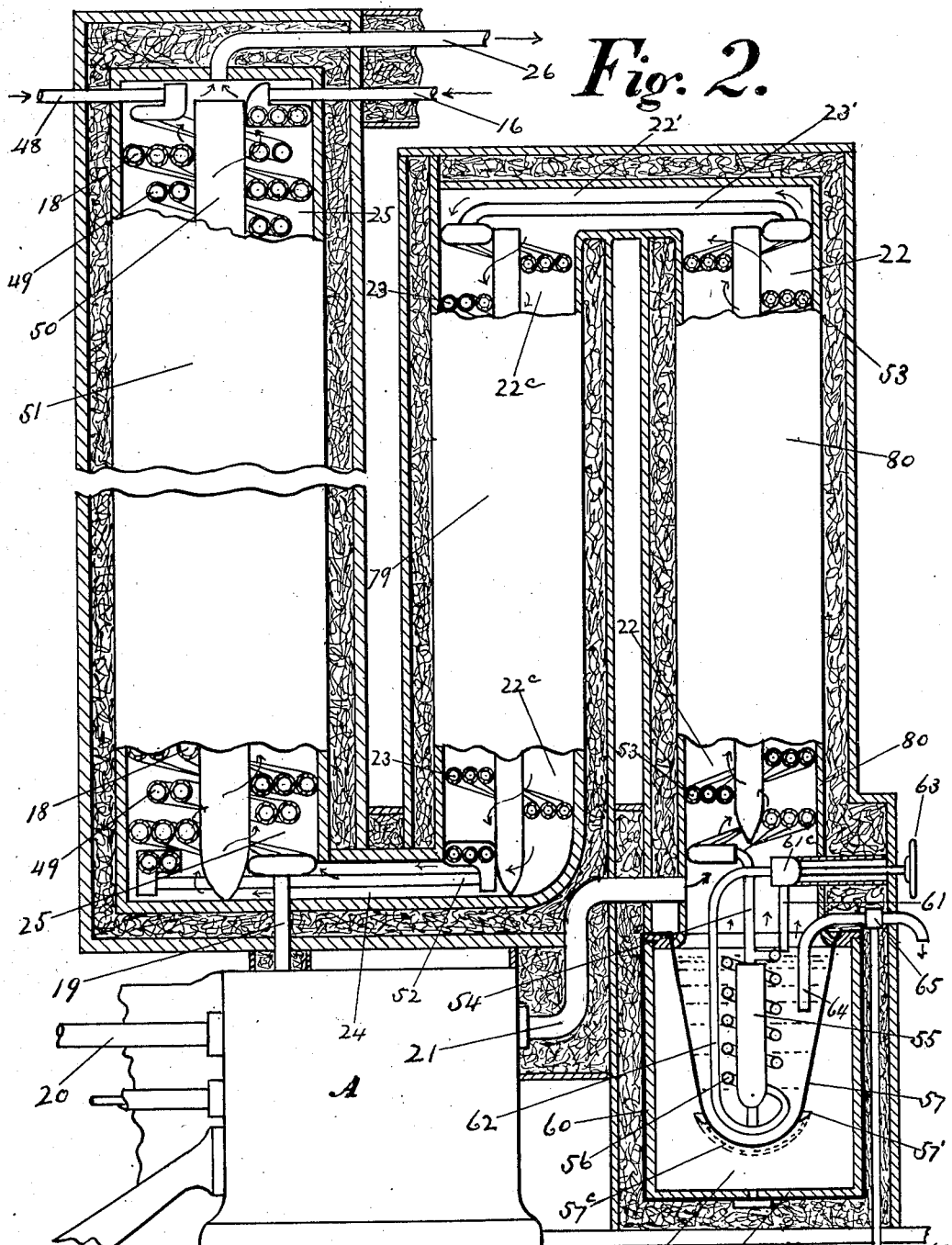

Figure 1 is a diagrammatic view, partly in vertical section showing how I prepare the air for liquefaction—compress the same, absorb by chemical action and freeze out the moisture, remove the $CO_2$ gas therefrom, and precool that portion which is expanded in a closed cycle. Fig. 2 is a view in vertical section of my improved counter-current system, showing the mechanism I employ in my improved process for cooling the air to be liquefied, by the vapor or cold expanding gases evaporated from low-pressure liquid air, reinforced in refrigerative effect by the cold exhaust air expanded against external resistance in an air-expansion engine; also showing my process of liquefying in a submerged condenser, air compressed to substantially its critical pressure, by utilizing the latent heat required by liquid air in evaporating at substantially atmospheric pressure.

In my process set forth in Serial No. 334,104 I use an initial charge of liquid air to start the process of liquefying air; or if such an initial charge is not to be had, I provide for producing an initial charge by what is known as a throttled nozzle, availing of the familiar principle called the "Joule-Thompson effect," whereby a cumulative refrigerative result is obtained by expanding air through a throttled nozzle from a constant relatively high to a constant relatively low pressure. My present invention is based on a different method. I neither use nor require an initial charge of liquid air, from an outside source; neither do I make use of the throttled nozzle, nor utilize the so-called "Joule-Thompson effect." I produce my initial charge of low-pressure liquid air, and constantly replenish the same, as desired, in part, by making use of the cold expanded exhaust air from an air-expansion engine, wherein I expand compressed air against external resistance; and after using this cold exhaust air to cool and liquefy air compressed to or above its critical pressure, I utilize it further for cooling the compressed air of less compression supplied to the engine for expansion therein.

With my present process I also utilize the latent heat of vaporization required by liquid air at substantially atmospheric pressure, to cool and liquefy air while at or above its critical pressure when there is no latent heat of condensation given out to neutralize refrigeration and retard liquefaction. It is well known that the critical pressure of air is about 39 atmospheres, and its critical temperature is $-220°$ F. It will condense to a liquid at $-220°$ F., if it be compressed to about 39 atmospheres; and it will liquefy at a lower compression if cooled to a lower temperature, or at atmospheric pressure if cooled to $-312.6°$ F.; but no amount of compression will cause liquefaction unless it be cooled to its critical temperature, namely, $-220°$ F. If compressed to about 39 atmospheres and cooled to $-220°$ F., its density then as a gas is identical with its density as a liquid; and with the slightest lowering of the temperature then, its change of state from a gas to a liquid (if the pressure is maintained) is instantaneous, and there can be no latent heat of condensation, as there is practically no further contraction.

By my present process I compress the air which is to be liquefied to about 50 atmospheres (about 720 lbs. gage), and liquefy all of the air thus compressed, without reduction of pressure. The air which I expand in the air-compression engine, for use in producing the initial charge of liquid air and to reinforce or augment the refrigeration thereafter as desired, I compress usually to not above 13 atmospheres (or about 176 lbs. gage). All of the high-pressure air is liquefied in a condenser, having no outlet for air until after it is liquefied, and which is submerged in a constantly maintained charge of liquid air at substantially atmospheric pressure. This highly compressed air in the submerged condenser being constantly maintained at or above its critical pressure, it consequently liquefies at $-220°$ F.; while the temperature of the low-pressure evaporating liquid air surrounding the condenser is constantly maintained at $-312.6°$, or about 93 degrees colder. With these conditions, naturally the highly-compressed air in the submerged condenser liquefies very rapidly, and is thereafter sub-cooled to about the temperature of the low-pressure evaporating liquid air ($-312.6°$); it is then released from pressure and is delivered to the low-pressure liquid air around the condenser to replenish the same, and in part is used to liquefy a new supply of cooled high pressure air which has taken its place in the condenser. That portion of the low-pressure liquid air which is evaporated during the process is conducted back over the incoming supply of compressed air, (first over that which is to be liquefied, and then over that which is to be expanded in the engine), in form of cold vapor and expanding air. The latent heat of condensation, given out by the high-pressure air in liquefying is, as stated herein, practically *nil*. The latent heat of vaporization required by the low-pressure evaporating liquid air is about 120 B t u. per pound, and this, with the cooling effect of the vapor and expanding air of the evaporated liquid (starting at $-312°$ and absorbing heat until it leaves the system at normal temperature), and the cooling effect of the cold expanded air from the engine (equivalent to the work thereof)—is all utilized.

I will now describe the appliances shown in the drawings to illustrate my improved process, in which similar reference characters refer to similar parts throughout.

In Fig. 1 the numeral 1 refers to the compressor for compressing the air expanded in the engine, shown only in outline at A in Fig. 2. This engine is of the ordinary reciprocating type, with a cut-off valve, but is inclosed in an outer case packed with insulating material. At 2 (see Fig. 1) I show an ordinary water cooler for removing the heat of compression; the compressed air from the compressor is passed through the water cooler to the discharge pipe 3, and is thence delivered to the calcium chlorid drum 4 which is filled with charges of lump calcium chlorid (5) in baskets or on shelves, 6. The air is passed up through the drum in contact with said charges, and into pipe 7, from which it is delivered to the caustic potash drum 8, and passes up through and in contact with the caustic potash charges 9, and thence to pipes 10 and 11. From here the air, now practically dry, is passed through the pre-cooling drum 12. This drum is made with a triple helical coil 13, around the center core 14 delivering to the drip holder 15 and to the outlet pipe 16. It is so constructed that there is an expanded air return-flow passage 17 which will be referred to later on. The air now passes from pipe 16 to the thermal interchanger 51 (see Fig. 2). This consists of the triple helical descending coils 18 (to which the pipe 16 delivers) and which delivers to the engine feed pipe 19. From here the compressed air (at about 176 lbs. gage) is taken and expanded to atmospheric pressure against external resistance on the piston rod 20. The cold expanded air exhausted from the engine is conducted through the exhaust conduit 21 to the high-pressure air-liquefier supply pipes 53, and passes up and over the same in the helical expanded air passage 22, and through passage 22' down between the high-pressure triple coils 23 into the passage 24. From here it passes up through the helical passage 25, formed between the engine supply triple coils 18, into the return-flow expanded air pipe 26, and through the pre-cooler helical passage 17 into pipe 26' and is thence delivered to the compressor 1 (see Fig. 1) to be re-compressed—for this air is used over and over in a closed circuit; and after it has once been through the engine, then by closing valves 27, 28 and 28° and opening valves 29 and 30, the hygroscopic drums 4 and 8 are cut out of the circuit.

Recurring to Fig. 1, at 31 I show a high-pressure air compressor, arranged by stages to compress air from atmosphere to about 50 atmospheres (or about 720 lbs. gage), and remove the heat of compression by the cooler 32; then by opening valve 33 this highly-compressed air is passed through pipe 34 into and through the calcium chlorid drum 4 and then through pipe 7 into and through the caustic potash drum 8—the calcium chlorid absorbing moisture and the caustic potash absorbing more moisture and the carbonic acid gas from the air. Then by opening valve 35 (valve 36 being closed) the air is conducted through pipe 37 into the $CO_2$ freezing drum 38. This freezing drum (38) is a part of a system of mechanical refrigeration, for freezing out the remaining traces of moisture left in the air, and serves also as an auxiliary cooler to bring the high-pressure air to be liquefied down to a low initial temperature, so as to lessen the refrigerative work required of the return flow air in the thermal interchanger and offset any losses or "thermal gains" due to imperfect insulation. The system consists of the compressor 39, the condenser 40 its lower end being connected through the pipe 41 with the liquid-gas pressure-releasing valve 42, and the descending evaporating pipe 43 and ascending vaporizing triple coils 44. Carbonic acid gas is preferably used in the system, and this gas, evaporated from the liquid $CO_2$ in the pipe 43 and vaporizing cooling coils 44, is returned to the compressor through low-pressure pipe 45. The highly-compressed air from pipe 37 passes down in the helical passage 46, and up through the inner conduit 47 and out through pipe 48, in a contrary direction to the flow of $CO_2$ refrigerating gas. A temperature of 30° to 40° below zero may be easily maintained in the freezing drum in this manner; and the highly-compressed air to be liquefied is delivered through pipe 48 to the supplementary duplicate coils 49 (see Fig. 2) in the interchanger (51) at this low temperature, practically entirely free of moisture. The duplicate descending high-pressure helical coils 49 pass down around the core center 50 (in the expanded air passage 25 in the interchanger drum), and by the connecting pipe 52 deliver to the ascending triple helical coils 23, which connects with the descending triple helical coils 53 through pipe 23'. These coils connect by pipe 54 with the submerged air-liquefying condenser 55; this condenser consisting of the closed drum 55 and coil 56 connecting with same at top and bottom. This condenser is located within the low-pressure evaporating vessel 57 which is inclosed by the vacuum insulation 58 within the barrel 59—the vacuum being held by the air-tight sheet metal inclosure 60, from which the vessel 57 is formed. The condenser 55 has a liquid-air discharging valve 61, the inlet to which is the siphon tube 62, arranged so that only air after it is liquefied can be discharged from said condenser; said valve being operated by the outside hand wheel 63. At 64 I have an overflow outlet, controlled by the valve 65 and hand wheel 66.

The vacuum in the barrel 59 around the vessel 57, is produced preferably by filling the barrel 59 with $CO_2$ gas, and then when the liquid air accumulates in the vessel 57, this $CO_2$ gas is quickly condensed to a liquid and collects in the annular "catch" 57' where it is prevented from reëvaporating by the extreme cold. At 57° I have a wire gage cup filled with charcoal to absorb any trace of air in the $CO_2$ gas—charcoal having great power of absorbing air when at extreme low temperature. In this way almost a perfect vacuum insulation is provided for the liquid air in vessel 57.

The cold expanded exhaust air from the expansion engine delivered from the conduit 21 is passed up, around and over the highly compressed air in the triple liquefying helical coils 53, in a counter-current to the flow of highly compressed air in said coils; and as the air therein, compressed to or above its critical pressure, liquefies, it falls by gravity into the condenser 55; when this condenser is filled, it is released from pressure and discharged into the evaporating vessel 57, thus submerging said condenser in the liquid air at substantially atmospheric pressure in said vessel. This evaporating liquid falls to a temperature of $-312.6°$ F., and quickly liquefies the cooled compressed air which has taken its place in the condenser; for such air being maintained at a tension at or above its critical pressure, it changes to a liquid at or below $-220°$ without change of volume or the evolution of any heat. The vessel 57 being thoroughly insulated from outside heat by the vacuum 58, all heat for evaporating the liquid air therein must be drawn from the highly-compressed air in the submerged condenser 55 and liquefying coil 56. In the evaporating vessel 57 a surplus soon accumulates, which may be withdrawn from the system through the overflow tube 64. Once filled this low-pressure liquid air evaporating vessel (57) cannot be emptied—it can only overflow and discharge the surplus liquefied air from the system through the outlet 64; and being constantly filled, the submerged high-pressure condenser (55 and 56) is constantly submerged in the evaporating liquid air therein.

It will be seen that the highly-compressed air in the coils 53 and 23, which supplies the submerged condenser, is first subjected to the cooling action of both the vapor evaporated from the low-pressure liquid air in vessel 57 and of the cold expanded air from conduit 21 exhausted from the engine; and then the compressed air of less tension being supplied to said engine for expansion therein (in coils 18) is also cooled by said outflowing cold exhaust therefrom and by the vapor or expanding air evaporated from the low-pressure liquid in said vessel (57). The last cooling effect of this expanded exhaust air and these cold distilled gases, is utilized in the pre-cooling drum 12 (see Fig. 1), in the helical passage 17, to cool the compressed air used in the engine closed circuit as it is received from the water cooler 2 and passes down through the triple coils 13. The surplus expanded air, over and above what the engine requires, is allowed to escape through the check-valve 67; and the efficiency of the process in operation is so high that the air thus escaping is rarely of lower temperature than the compressed air entering the precooler drum from pipe 11. At intervals of a few days any moisture in form of frost on the outside of the $CO_2$ coils 44 and pipe 43, may be melted by hot air from the compressor 31; the water in cooler 32 being shut off, valves 33, 35 and 68 being closed and valve 36 and cock 69 being opened. So also any frost in triple coil 13 in the pre-cooler (12) may be melted by hot air from the compressor 1, by shutting off the water from cooler 2, and closing valves 27, 28, 30 and 70 and opening valves 29 and 28ᶜ and drip cock 71. Drip cocks 72 and 73 are provided for draining the hygroscopic drums, 4 and 8. Power from an outside source may be supplied to the compressor fly-wheels 74, 75 and 76; and the power of the air-expanding engine A (Fig. 2) may be utilized in helping to drive these compressors. The compressor 31 takes in air through the check valve 77; and the low-pressure compressor takes air in through check valve 78 and valve 28ᶜ in starting up, or until the circuit is filled. The $CO_2$ freezing drum (38) and the pre-cooler (12) and thermal interchanger low-pressure conduits 51, 79 and 80 with their connecting pipes, are all insulated against circumambient heat.

By my process I not only liquefy air, but partially separate the same into its constituent gases, oxygen and nitrogen, by fractional distillation in evaporating principally the nitrogen of the liquid air in the vessel 57, so that the surplus liquid drawn from the tube 64 will be very rich in oxygen, and the surplus gas escaping from check valve 67 will be correspondingly rich in nitrogen. The proportion of the two gases in the liquid drawn from the system however, may be maintained practically the same as in the atmosphere, 21% oxygen and 79% nitrogen by closing valve 67 and opening valve 82 (see Fig. 1), when the surplus expanded gas in the return-flow pipe 26' will then be passed through pipe 81 and be re-compressed in the high-pressure compressor 31, and only air enough will then be drawn in through the check valve 77 to make up for the liquid drawn from outlet 64. (See Fig. 2).

Having thus described my invention what I claim as new and original and desire to secure by Letters Patent, is—

1. The art or process of liquefying air consisting of or including, the compressing of the air to be liquefied to substantially its critical pressure, and the air to be used to cool and liquefy the same to a less pressure; the expansion of the last named air or that of relatively low compression, against external resistance in a closed circuit; and then subjecting the air to be liquefied or that of relatively high compression to the cooling action of said air of relatively low compression after expansion of the same in said closed circuit.

2. The art or process of liquefying air, consisting of or including the compressing of the air to be liquefied, to substantially its critical pressure, and removing the heat of compression therefrom; then compressing other and successive charges of air to less pressure than the air to be liquefied removing the heat of compression therefrom, and expanding the same against external resistance; and then utilizing the said cold expanded air to cool, successively—first, the said cooled compressed air to be liquefied; and second, the said cooled air of less compression to be expanded.

3. The art or process of liquefying air, consisting of or including the compressing of the air to be liquefied, to substantially its critical pressure, and removing the heat of compression therefrom; then compressing other and successive charges of air to less pressure than the air to be liquefied, removing the heat of compression therefrom, and expanding the same against external resistance; and then utilizing the said cold expanded air to cool, successively—first, the said cooled compressed air to be liquefied, and second, the said cooled air of less compression to be expanded—the said air of less compression to be compressed, cooled, expanded and utilized as aforesaid, consecutively over and over, in a closed circuit.

4. The art or process of liquefying air, consisting of or including the compressing of the air to be liquefied substantially to or above its critical pressure, removing the heat of compression therefrom, and subjecting the same to the refrigerative effect of a liquid-gas released from pressure and evaporated; then compressing other and successive charges of air to less pressure than that of the air to be liquefied, removing the heat of compression therefrom, and expanding the same against external resistance; and utilizing the said cold expanded air to cool successively,—first, the said highly-compressed air to be liquefied, and second, the said air of less compression to be expanded.

5. The art or process of liquefying air, consisting of or including the compressing of the air to be liquefied substantially to or above its critical pressure, removing the heat of compression therefrom, and subjecting the same to the refrigerative effect of a liquid-gas released from pressure and evaporated; then compressing other and successive charges of air to less pressure than that of the air to be liquefied, removing the heat of compression therefrom, and expanding the same against external resistance; and utilizing the said cold expanded air to cool successively,—first, the said highly-compressed air to be liquefied, and second, the said air of less compression to be expanded,—the said air of less compression to be compressed, cooled, expanded and utilized as aforesaid, consecutively over and over in a closed circuit.

6. The art or process of liquefying atmospheric air, consisting of or including the method of compressing air to a relatively high tension, and then cooling and liquefying the same without reduction of pressure by cold air of substantially atmospheric pressure, after its expansion against external resistance from a less compression than the air cooled and liquefied.

7. The art or process of liquefying atmospheric air, consisting of or including the method of compressing air to a relatively high tension, and then cooling and liquefying the same without reduction of pressure by the low-pressure cold exhaust air from an air-expansion engine, previously compressed to a less tension than the air being liquefied, and expanded therefrom in said engine against external resistance.

8. The art or process of liquefying atmospheric air, consisting of or including the method of compressing air to a relatively high tension, and then cooling and liquefying the same without reduction of pressure by cold air of substantially atmospheric pressure, after its expansion against external resistance from a less compression than the air cooled and liquefied—said cooling action being re-inforced or augmented, in refrigerative effect, by the vapor and cold expanding gases evaporated from low-pressure liquid air previously liquefied at relatively high tension as aforesaid.

9. The art or process of liquefying atmospheric air, consisting of or including the method of compressing air to a relatively high tension, and then cooling and liquefying the same without reduction of pressure by the low-pressure cold exhaust air from an air-expansion engine, previously compressed to a less tension than the air being liquefied, and expanded therefrom in said engine against external resistance—said cooling action of said expanded exhaust air being re-inforced or augmented, in refrigerative effect, by the vapor and cold expanding gases evaporated from low-pressure liquid air previously liquefied at relatively high tension as aforesaid.

10. The art or process of liquefying atmospheric air, comprising the compressing of air substantially to or above its critical pressure, and liquefying it at that tension by the cold expanded air exhausted from an air-expansion engine, supplemented or augmented in refrigerative effect by the vapor and cold expanding gases evaporating from liquid air of substantially atmospheric pressure.

11. The art or process of liquefying atmospheric air, comprising the compressing of air substantially to or above its critical pressure, and liquefying it at that tension by the cold expanded air exhausted from an air-expansion engine, supplemented or augmented in refrigerative effect by the vapor and cold expanding gases evaporating from liquid air of substantially atmospheric pressure; and then sub-cooling said newly liquefied air at said high pressure by subjecting the same to the refrigerative action direct of said evaporating low-pressure liquid air.

12. The art or process of liquefying atmospheric air, comprising the compressing of air to a relatively high pressure and liquefying it at said high tension by cold expanded air exhausted from an air-expansion engine, supplemented or augmented in refrigerative effect by the vapor and expanding gases from liquid air of substantially atmospheric pressure, being evaporated by heat drawn from liquid air of said high tension previously liquefied as aforesaid.

13. The art or process of liquefying atmospheric air, comprising the compressing of air, and removing the heat of compression and moisture therefrom, then cooling the same by a counter-current of cold expanded air exhausted from an air-expansion engine, re-inforced or augmented in refrigerative effect by the vapor and cold expanding gases evaporated from a charge of liquid air of substantially atmospheric pressure; and then subjecting said cooled compressed air, without reduction of pressure, to the cooling action direct of said low-pressure evaporating liquid air charge.

14. The art or process of liquefying atmospheric air or other gases, which comprises compressing portions of gas to substantially at or above its critical pressure and liquefying it while at such high pressure by other portions of gas which has been regeneratively cooled by compression to a lower pressure and subsequent expansion.

15. The art or process of liquefying atmospheric air or other gases, which comprises compressing portions of gas to a relatively high tension and liquefying it while at such high tension by other portions of gas which has been regeneratively cooled by compression to a relatively low tension and subsequent expansion against external resistance.

16. The art or process of liquefying atmospheric air or other gases, which comprises utilizing gas which has been regeneratively cooled by compressing it to a relatively low tension and then expanding it in an engine to liquefy other portions of gas which has been compressed to and while maintained at a relatively high tension.

17. The art or process of liquefying air or other gases, which comprises compressing gas to a relatively high tension and while at such high tension liquefying it by other gas which is regeneratively cooled by alternately compressing it to a relatively low tension and then expanding it in a closed cycle.

18. The art or process of liquefying air or other gases, which comprises compressing the gas to a relatively high pressure and while at such high pressure liquefying it by the refrigerative effect of gas regeneratively cooled in a closed cycle by first compressing it to a relatively low pressure, expanding it in an engine and then conducting it back in counter-current to the compressed gas supplied to the engine to be re-compressed.

19. The art or process of liquefying air or other gases, which comprises compressing the gas to be liquefied to substantially at or above its critical pressure and removing the heat of compression therefrom, compressing other portions of gas to a lower pressure and removing the heat of compression therefrom and then expanding the same against external resistance, and utilizing the cold expanded gas thus obtained to successively cool the said compressed gas of high pressure and the said gas of lower pressure.

20. The art or process of liquefying air, which comprises compressing the air to a relatively high tension and removing the heat of compression therefrom, and compressing other portions of air to a lower tension and removing the heat of compression therefrom and then expanding the same in an engine and utilizing the cold expanded air from the engine to cool first the said air of high tension and then the said air of lower tension supplied to the engine.

21. The art or process of liquefying air, which comprises compressing the air to a relatively high tension and removing the heat of compression therefrom, and repeatedly compressing other air to a lower tension, removing the heat of compression therefrom, expanding the same in an engine and conducting it back to be again re-compressed, utilizing the return of the cold expanded air in counter-current thereto to cool first the said air of relatively high tension and then the said air of lower tension.

22. The art or process of liquefying atmospheric air or other gases, which comprises compressing such air or other gas substantially to or above its critical pressure and while at such high pressure liquefying it by the refrigerative effect of gas regeneratively cooled by compression substantially below its critical pressure and expansion in an engine, supplemented or augmented by the vapor from previously liquefied gas at substantially atmospheric pressure.

23. The art or process of liquefying air or other gases, which comprises compressing the gas substantially to or above its critical pressure and while at such high pressure liquefying it by the refrigerative effect of gas regeneratively cooled by compression to a pressure below its critical pressure and expansion in an engine, then withdrawing successive portions of the gas thus liquefied, reducing its pressure to substantially atmospheric pressure, and utilizing the vapor therefrom to supplement or augment the refrigerative effect of the said cold expanded gas from the engine to liquefy succeeding portions of gas of high pressure supplied to replace the liquefied gas thus withdrawn.

24. The art or process of liquefying air or other gases, which comprises compressing the gas substantially to or above its critical pressure and while at such pressure liquefying it by the combined refrigerative effect of cold expanded gas exhausted from an engine and previously liquefied gas evaporating at substantially atmospheric pressure.

25. The art or process of liquefying air or other gases, which comprises compressing the gas substantially to or above its critical pressure and while at such pressure liquefying it by the combined refrigerative effect of gas expanded in an engine from a pressure below its critical pressure and of previously liquefied gas evaporating at substantially atmospheric pressure.

26. The art or process of liquefying air or other gases, which comprises compressing the gas to a relatively high pressure and while at such tension liquefying it by the combined refrigerative effect of gas which has been regeneratively cooled in a closed cycle by compressing it to a relatively low pressure expanding it in an engine and conducting it back to the compressor in counter-current to the compressed gas supplied to the engine, and of previously liquefied gas evaporating at substantially atmospheric pressure.

27. The art or process of liquefying air or other gases, which comprises compressing the gas to a relatively high pressure and while at such tension liquefying it by the combined refrigerative effect of gas which has been regeneratively cooled in a closed cycle by compressing it to a relatively low pressure, expanding it in an engine, and conducting it back to the compressor in counter-current to the compressed gas supplied to the engine, and of previously liquefied gas evaporating at substantially atmospheric presssure; and maintaining the supply of the said liquefied gas at atmospheric pressure by the withdrawal of successive portions of the said gas liquefied at high pressure.

28. The art or process of liquefying air, which comprises compressing the air substantially to or above its critical pressure and liquefying it at that tension, and then withdrawing portions of the said liquefied air, reducing its pressure to substantially atmospheric pressure and utilizing the cold vapor therefrom to liquefy and sub-cool the air at high pressure supplied to replace the liquefied air thus withdrawn.

29. The art or process of liquefying air, which comprises compressing the air to a relatively high tension and while at such tension liquefying it by the refrigerative effect of air which has been regeneratively cooled by compression to a lower tension and expansion in an engine, and then successively withdrawing portions of the air thus liquefied, reducing the pressure thereof to substantially atmospheric pressure, and utilizing the cold vapor therefrom to liquefy and sub-cool succeeding portions of air of high tension supplied to replace the liquefied air thus withdrawn.

30. The art or process of liquefying air, which comprises compressing the air to a tension substantially at or above its critical pressure and while at such tension liquefying it, then successively withdrawing portions of the liquefied air, reducing the pressure thereof to substantially atmospheric pressure and utilizing the cold vapor therefrom, supplemented by the refrigerative effect of air which has been regeneratively cooled by compression to a pressure below its critical pressure and then expanded, to liquefy succeeding portions of air at high tension supplied to replace the liquefied air thus withdrawn.

31. The art or process of liquefying air or other gas, which comprises compressing the gas substantially to or above its critical pressure and while at such high pressure liquefying it by the refrigerative effect of gas regeneratively cooled in a closed cycle by compressing it to a pressure below its critical pressure, expanding it in an engine, and conducting it back to be re-compressed in counter-current to the supply of compressed gas to the engine; and then successively withdrawing portions of the gas liquefied at high pressure, reducing the pressure thereof to substantially atmospheric pressure, and utilizing the vapor therefrom to supplement and augment the refrigerative effect of the gas exhausted from the engine.

32. The art or process of liquefying air or other gas, which comprises compressing the gas substantially to or above its critical pressure, removing the heat of compression and moisture therefrom, and while at such high pressure liquefying it by the refrigerative effect of gas regeneratively cooled by compression to a pressure below its critical pressure and expansion in an engine, and successively sub-cooling and withdrawing the gas thus liquefied at high pressure and reducing its tension to atmospheric pressure in such a way as to utilize its refrigerative effect after withdrawal to sub-cool the liquefied gas of high pressure supplied to replace the liquefied gas thus removed.

Signed at New York city in the county of New York and State of New York this first day of November A. D. 1907.

JAMES F. PLACE.

Witnesses:
JOHN H. ACKROYD,
J. G. GADSDEN.